United States Patent
Rivas Molina et al.

(10) Patent No.: US 10,326,605 B2
(45) Date of Patent: Jun. 18, 2019

(54) POLICY CONTROL IN SESSION INITIATION PROTOCOL FORKING

(71) Applicant: Telefonaktiebolaget LM Ericsson (publ), Stockholm (SE)

(72) Inventors: Ignacio Rivas Molina, Madrid (ES); Venkata Ramesh Balabhadruni, Kista (SE); Patrik Dannebro, Hisings Kärra (SE); Rikard Eriksson, Jörlanda (SE); Susana Fernandez Alonso, Madrid (ES); Fredrik Lindholm, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 155 days.

(21) Appl. No.: 15/326,130

(22) PCT Filed: Jul. 16, 2014

(86) PCT No.: PCT/EP2014/065269
§ 371 (c)(1),
(2) Date: Jan. 13, 2017

(87) PCT Pub. No.: WO2016/008522
PCT Pub. Date: Jan. 21, 2016

(65) Prior Publication Data
US 2017/0214534 A1 Jul. 27, 2017

(51) Int. Cl.
*H04L 12/24* (2006.01)
*H04L 12/14* (2006.01)
(Continued)

(52) U.S. Cl.
CPC ........ *H04L 12/1407* (2013.01); *H04L 65/105* (2013.01); *H04L 65/1006* (2013.01);
(Continued)

(58) Field of Classification Search
CPC ............. H04L 12/1407; H04L 65/1006; H04L 65/1046; H04L 65/105; H04L 65/1069;
(Continued)

(56) References Cited

U.S. PATENT DOCUMENTS 9,602,556 B1 * 3/2017 Cham ................... H04L 65/40
2005/0125543 A1 * 6/2005 Park .................. H04L 29/06027
709/227

(Continued)

FOREIGN PATENT DOCUMENTS

WO WO-2013144505 A1 * 10/2013 ............ H04M 15/66

OTHER PUBLICATIONS

Title: PCC Support of the Early Session Disposition Type; Source: Nokia Siemens Networks; 3GPP TSG-CT WG3 Meeting #55; Phoenix, USA (C3-091246)—Oct. 12-16, 2009.
(Continued)

*Primary Examiner* — Robert J Lopata
(74) *Attorney, Agent, or Firm* — Baker Botts, LLP

(57) ABSTRACT

Methods and apparatuses for updating policy and charging rules relating to early dialogs in session initiation protocol forking in a telecommunications network. A node comprises a receiver (304), configured to receive a plurality of preliminary responses originating from a plurality of terminating end points as part of Session Initiation Protocol, SIP, forking. The node comprises an early dialog controller (314), configured, for each received preliminary response, to determine a unique identifier and to control a transmitting means, which may be a transmitter (302), to transmit a corresponding preliminary message comprising the unique identifier to a further node (400) for use as a Policy and Charging Rules Function, PCRF (200), for creating an early dialog by the further node. The receiver is further configured to receive updated data for at least one of the preliminary
(Continued)

responses. The node further comprises an updated dialog controller (316) configured to retrieve the unique identifier corresponding to the at least one preliminary response and control the transmitter to transmit an updating message based on the updated data and comprising the retrieved unique identifier to the further node for updating the corresponding early dialog.

18 Claims, 7 Drawing Sheets

(51) Int. Cl.
*H04W 76/11* (2018.01)
*H04L 29/06* (2006.01)
*H04W 4/16* (2009.01)
*H04M 15/00* (2006.01)
*H04W 4/24* (2018.01)
H04W 80/10 (2009.01)

(52) U.S. Cl.
CPC ...... *H04L 65/1046* (2013.01); *H04L 65/1069* (2013.01); *H04L 65/80* (2013.01); *H04M 15/57* (2013.01); *H04M 15/62* (2013.01); *H04M 15/63* (2013.01); *H04M 15/66* (2013.01); *H04M 15/8228* (2013.01); *H04W 4/16* (2013.01); *H04W 4/24* (2013.01); *H04W 76/11* (2018.02); H04W 80/10 (2013.01)

(58) Field of Classification Search
CPC ....... H04L 65/80; H04M 15/57; H04M 15/62; H04M 15/63; H04M 15/66; H04M 15/8228; H04W 4/16; H04W 4/24; H04W 76/11; H04W 80/10
USPC .......................................................... 370/259
See application file for complete search history.

(56) References Cited

U.S. PATENT DOCUMENTS

| | | | | |
|---|---|---|---|---|
| 2007/0002775 A1* | 1/2007 | Belling | ................... | H04L 29/06 370/260 |
| 2007/0058537 A1* | 3/2007 | Belling | ............. | H04L 29/06027 370/230 |
| 2009/0238358 A1* | 9/2009 | Ramanathan | ..... | H04M 3/42042 379/221.03 |
| 2011/0040883 A1* | 2/2011 | Belling | ............... | H04L 65/1069 709/228 |
| 2011/0238547 A1* | 9/2011 | Belling | .................. | G06Q 30/04 705/34 |
| 2012/0081557 A1* | 4/2012 | Kupinsky | ........... | H04L 12/1407 348/207.1 |
| 2013/0219070 A1* | 8/2013 | Kramarenko | ....... | H04L 65/1069 709/227 |
| 2013/0246632 A1* | 9/2013 | Ginde | ................. | H04L 65/1006 709/227 |
| 2014/0068102 A1* | 3/2014 | Mann | ...................... | H04L 67/28 709/238 |
| 2014/0068710 A1* | 3/2014 | Lau | ......................... | G06F 21/00 726/3 |
| 2014/0233717 A1* | 8/2014 | Pujic | .................. | H04L 65/1083 379/211.02 |
| 2015/0163838 A1* | 6/2015 | Bouvet | ............... | H04L 65/1006 370/329 |
| 2015/0237144 A1* | 8/2015 | Miao | ...................... | H04L 67/14 709/228 |
| 2016/0373956 A1* | 12/2016 | Zhang | ................... | H04W 28/24 |
| 2017/0331691 A1* | 11/2017 | Zhou | ...................... | H04L 69/08 |

OTHER PUBLICATIONS

3rd Generation Partnership Project; Technical Specification Group Core Network and Terminals; Policy and Charging Control Over Rx Reference Point (Release 12); 3GPP TS 29.214 v12.4.1—Jul. 2014.
International Search Report for International application No. PCT/EP2014/065269—dated Mar. 11, 2015.
ETF RFC 3261, "SIP: Session Initiation Protocol" by J. Rosenberg et al.—Jun. 2002.
3GPP TS 23.228, "IP Multimedia Subsystem (IMS); Stage 2", v.11.5.0—Jun. 2012.
3GPP TS 24.229, "IP Multimedia Call Control Protocol Based on Session Initiation Protocol (SIP) and Session Description Protocol (SDP); Stage 3", v11.11.0—Mar. 2014.
3GPP TS 29.214, "Policy and Charging Control Over Rx Reference Point", v11.9.0 (Release 11)—Jun. 2013.
3GPP TS 24.182, "IP Multimedia Subsystem (IMS) Customized Alerting Tones (CAT); Protocol Specification", v11.1.0—Sep. 2013.

* cited by examiner

POLICY CONTROL IN SESSION INITIATION PROTOCOL FORKING

PRIORITY

This non-provisional application is a U.S. National Stage Filing under 35 U.S.C. § 371 of International Patent Application Serial No. PCT/EP2014/065269 filed Jul. 16, 2014, and entitled "Policy Control in Session Initiation Protocol Forking."

TECHNICAL FIELD

The invention relates to session initiation protocol forking. More specifically, the invention relates to, but is not limited to, updating policy and charging rules relating to early dialogs in session initiation protocol forking.

BACKGROUND

Session Initiation Protocol (SIP) forking is the ability of a SIP proxy server to fork SIP request messages to multiple destinations according to IETF RFC 3261. This allows the Internet Protocol (IP) Multimedia Subsystem (IMS) to send an incoming SIP request addressed to a Public User Identity to multiple terminating end points when multiple contact addresses have been registered for the same Public User Identity.

Support for SIP forking in the IMS is specified in 3GPP TS 23.228, and the related User Equipment (UE) procedures are described in 3GPP TS 24.229. Support for SIP forking when policy control is applied is specified in 3GPP TS 29.214.

The typical use case is as follows. A connected UE initiates an IMS session by sending an INVITE request to a Proxy Call Session Control Function (P-CSCF). The P-CSCF forwards the INVITE towards a Serving Call Session Control Function (S-CSCF) and then the S-CSCF towards a terminating IMS network. The terminating IMS network sends the request in parallel to multiple registered contact addresses for the called party, creating several early dialogs from a single request. Each terminating end point sends a preliminary SIP response and, after successful SDP negotiation, starts ringing. The terminal that answers the call sends a final 200 OK (for INVITE) response, and the communication path is established to this particular end point, whilst all other early dialogs are cancelled or released.

As a result, the originating P-CSCF may receive multiple preliminary SIP responses due to forking, as multiple early media sessions may be established before the final SIP response is received. When policy control is applied, a Policy and Charging Rules Function (PCRF) is contacted for each early media session as it needs to be authorized, and the allocated resources may need to be updated when subsequent preliminary responses are received, according to the resources needed by each early dialog.

Policy control is initiated when the P-CSCF establishes a Diameter session with the PCRF over an Rx reference point as part of the establishment of a SIP session. This can occur when the originating UE initiates the SIP request or upon reception of the first preliminary/final SIP response for the SIP request. This Diameter session is reused for each subsequent preliminary/final SIP response received as part of the same SIP session in order to provide additional or modified service information.

The UE and the P-CSCF become aware of the forking only when a subsequent preliminary SIP response arrives for a new early dialogue.

According to 3GPP TS 29.214, after the first early media session is established, for each subsequent preliminary SIP response establishing an additional early media session, the P-CSCF shall use an AA-Request (AAR) message within the existing Diameter session containing the SIP-Forking-Indication Attribute Value Pair (AVP) with the value SEVERAL_DIALOGUES and include the service information derived from the latest preliminary SIP response. An AA-Request (AAR) message is acknowledged towards the P-CSCF with an AA-Answer (AAA) message. For the sake of simplicity, AAA messages are neither further commented throughout this specification nor illustrated in any drawing.

In addition, the P-CSCF provisions the service information derived from any subsequent Session Description Protocol (SDP) offer-answer exchange within an early dialogue (e.g. in PRACK and 200 OK (PRACK), or UPDATE and 200 OK (UPDATE)) using an AAR message within the existing Diameter session containing the SIP-Forking-Indication AVP with value SEVERAL_DIALOGUES and the derived service information.

When receiving an AAR message containing the SIP-Forking-Indication AVP with value SEVERAL_DIALOGUES, the PCRF shall authorize any additional service data flow filters, any additional media components and any increased Quality of Service (QoS) requirements for the previously authorized media components, as requested within the service information. The PCRF shall authorize the maximum bandwidth required by any of the dialogues, but not the sum of the bandwidths required by all dialogues. The reason is that there will be early media sent from only one of the early dialogs, not from all the early dialogs. The PCRF shall also open or close the gates for service flows depending on the flow status that is being provisioned.

According to 3GPP TS 29.214, the P-CSCF shall store the SDP information for each early dialogue separately till a final SIP response is received. When the final SIP session is established, all the other early dialogues are terminated and the service information for the SIP session is updated to match the requirements of the remaining early dialogue only.

When receiving the first preliminary/final SIP response, the P-CSCF sends an AAR message without the SIP-Forking-Indication AVP and includes the service information derived from the SDP corresponding to the dialogue of the preliminary/final response. The PCRF updates the installed Policy Control and Charging (PCC) Rules information and Authorized-QoS information to match only the requirements of the service information within this AAR message, and also to open or close the gates for service flows according to the flow status in the received service information.

The Customized Alerting Tones (CAT) service is an IMS terminating service that triggers an external Customized Alerting Tones Server (CAT-S) to generate a customized signal (customized welcome message or selected music) towards the caller when the served user is alerted. The service allows an end user to define the customized alerting tones to be played, and is sometimes called Personal Ring Back Tone.

The Network Provided Ring Back Tone (NRBT) service is an IMS terminating service that triggers a Multimedia Resource Function Processor (MRFP) to generate an NRBT signal (customized welcome message or ringing tone)

towards the caller while the served user is alerted. The tone is common for all the IMS subscribers and is only configurable by an operator.

A common model to perform the CAT or NRBT service is by using the so called forking model. This means that an Application Server (AS) in the terminating side (either the Telephony Application Server (TAS) or the CAT-S) is simulating to be a forking leg. Hence, when the 180 Ringing message is received from the remote UE, the AS initiates a provisional early media session where the customized alerting tone is played. Finally, when the remote UE answers the call, the AS stops the ring back tone and forwards the final answer to establish the communication path between both parties.

Support for the CAT service in IMS is specified in 3GPP TS 24.182. Examples of signalling flows for the CAT service within the IMS subsystem can be found in 3GPP TS 24.182 Annex A.3

According to 3GPP TS 23.228, QoS-assured preconditions can be negotiated during IMS session establishment to ensure that resources are available in the network before the called subscriber is alerted, thus when the called subscriber answers the call the users are guaranteed to be able to communicate.

The usage of preconditions is strongly recommended as it prevents the problem of ghost ringing, i.e., that the call appears to be connected, but the users cannot talk with each other.

However, the usage of pre-conditions implies more SIP signaling during the session establishment and several invocations from IMS to the packet core network to update the resources with new session information during call establishment.

The Rx Flow-Number AVP, hereinafter referred to as flow identifier, is an ordinal number starting from 1 that identifies the IP flow within the media component (i.e. it identifies the traffic related to certain service for certain media, e.g. audio traffic). For a SIP session, the flow identifiers are derived from the SDP information as the ordinal number of the position of the "m=" line in the SDP, according to the following rules in 3GPP TS 29.214 Annex B.1.2.

The procedure guarantees that UE and Application Function (AF) assign the same ordinal number to each media component for a given application. Also, the ordinal number of a media component shall not be changed when the session description information is modified.

This means that all multiple preliminary SIP responses due to SIP forking will result in the same flow identifiers being sent from the P-CSCF to the PCRF.

The current support for SIP forking, as specified in 3GPP TS 29.214, does not allow the P-CSCF to modify the session information of a particular preliminary forking response.

This limitation comes from the fact that all preliminary responses due to forking make use of the same Diameter Rx session, and the SIP-Forking-Indication AVP can only have the value: SINGLE_DIALOGUE (0), or SEVERAL_DIALOGUES (1). In addition, the flow identifiers (Flow-Number AVP) derived by the P-CSCF for all preliminary responses overlap, as they are based on the Session Description Information (SDI) exchanged between the AF and the AF session client in the UE.

Hence, the PCRF will identify any AAR message containing the SIP-Forking-Indication AVP with value SEVERAL_DIALOGUES, as a new preliminary forking response from another terminating end point, when it may actually be a modification of the session information for a previous forking response. In this situation the PCRF will authorize the received service data flow filters as additional IP flows, when the wanted behavior is to modify the information provided in the existing PCC rules.

The main disadvantage of the existing solution is that the additional IP flows need to be notified to the UE for policy enforcement in the uplink path.

The P-CSCF may need to modify the session information of a preliminary forking response in the following situations.

When the P-CSCF provides preliminary service information not fully negotiated yet (e.g. based on the SDP offer), and then updates the service information with the SDP answer.

If the P-CSCF needs to enable or disable media IP flows depending on operator policy prior to the completion of the SIP session set-up, thus allowing or forbidding early media in forward and/or backward When the SIP terminal makes use of QoS preconditions FIG 1. shows current support for SIP forking policy control in 3GPP. The P-CSCF cannot modify the session information of a particular preliminary forking response, as required in step S-108. Hence, the P-CSCF provisions the new service information (SDP_b_update) as an additional early media session (step S-109). The PCRF believes that this is a new preliminary SIP response and then modifies the already provided PCC rules to include the service data flow filters provided in the latest AAR message (step S-111).

Since the PCRF believes that it is a new preliminary SIP response, the updated PCC rule will include the flow information as provided by the P-CSCF, as it is considered that, as it is coming from a different forking leg, it will be different from the previously provided information (different IP address/port from the terminating side). However, if the AAR message is referring to a modification of the session of an existing forking response where for example only the gate status is changed (e.g. enabled media flows are now disabled), the flow information has been already provided as part of a PCC Rule to the packet core network.

Upon reception of an updated PCC rule that contains service data flows, the enforcement point in the network (e.g. Packet Data Network Gateway, PGW) will initiate a bearer update procedure in order to provide the UE with the service data flows included in the PCC rule. This would create an unnecessary signalling towards the UE, as the terminal is already aware of this filter information.

Different alternatives can be considered in order to solve the problem:

Impact in the P-CSCF: The P-CSCF can check whether the received SIP response corresponds to the modification of an existing SIP dialogue or it refers to a new dialogue. In the first case, the P-CSCF would have to check, from the SDP data, which information has been already provided to the PCRF and which information is different from the already provided one. The P-CSCF would only provide the updated/new service information.

Impact in the PCRF: In order for the PCRF to identify that the service data flow information is the same than the previously provided would require that the PCRF checks, for each AAR command received with the SIP-Forking-Indicator, that the previously generated PCC rules already installed in the PGW have the same filter information.

Impact in the PGW: in order for the PGW to identify that the provided filter information has been already provided to the UE, it would have to retain the previously provided filter information and check it against the filter information provided in the PCC Rule.

The three alternatives have a strong performance impact and latency requirements that invalidate them as feasible solutions.

SUMMARY

According to the invention in a first aspect, there is provided a node for use as a Proxy Call Session Control Function, P-CSCF, in a telecommunications network. The node comprises a receiving means, which may be a receiver, configured to receive a plurality of preliminary responses originating from a plurality of terminating end points as part of Session Initiation Protocol, SIP, forking. The node comprises an early dialog controlling means, which may be an early dialog controller, configured, for each received preliminary response, to determine a unique identifier and to control a transmitting means, which may be a transmitter, to transmit a corresponding preliminary message comprising the unique identifier to a further node for use as a Policy and Charging Rules Function, PCRF, for creating an early dialog by the further node. The receiver is further configured to receive updated data for at least one of the preliminary responses. The node further comprises an updated dialog controller configured to retrieve the unique identifier corresponding to the at least one preliminary response and control the transmitter to transmit an updating message based on the updated data and comprising the retrieved unique identifier to the further node for updating the corresponding early dialog.

Optionally, the early dialog controller is configured to determine the unique identifier by creating said unique identifier or by using a SIP dialog identifier, which is included in the received preliminary response, as a basis for creating said unique identifier.

Optionally, the preliminary message and/or the updating message is an AA-Request, AAR.

Optionally, the early dialog controller is configured to determine the unique identifier as a new attribute value pair, AVP, for adding to the AAR, or to extend an existing AVP of the AAR.

Optionally, the updated data comprises data updating the service information for at least one early dialog.

According to the invention in a second aspect, there is provided a method for controlling a node for use as a Proxy Call Session Control Function, P-CSCF, in a telecommunications network. The method comprises receiving, by a receiving means, which may be a receiver, a plurality of preliminary responses originating from a plurality of terminating end points as part of Session Initiation Protocol, SIP, forking. The method comprises determining, by an early dialog controlling means, which may be an early dialog controller, for each received preliminary response, a unique identifier. The method comprises controlling, by the early dialog controller, a transmitting means, which may be a transmitter, to transmit a corresponding preliminary message comprising the unique identifier to a further node for use as a Policy and Charging Rules Function, PCRF, for creating an early dialog by the further node. The method comprises receiving, by the receiver, updated data for at least one of the preliminary responses. The method comprises retrieving, by an updated dialog controller, the unique identifier corresponding to the at least one preliminary response. The method comprises controlling, by the updated dialog controller, the transmitter to transmit an updating message based on the updated data and comprising the retrieved unique identifier to the further node for updating the corresponding early dialog.

Optionally, the method further comprises the early dialog controller determining the unique identifier by creating said unique identifier or by using a SIP dialog identifier, which is included in the received preliminary response, as a basis for creating said unique identifier.

Optionally, the preliminary message and/or the updating message is an AA-Request, AAR.

Optionally, the method further comprises the early dialog controller determining the unique identifier as a new attribute value pair, AVP, for adding to the AAR, or to extend an existing AVP of the AAR.

Optionally, the updated data comprises data updating the service information for at least one early dialog.

According to the invention in a third aspect, there is provided a computer program comprising instructions which, when executed on at least one processor, cause the at least one processor to carry out the method above.

According to the invention in a fourth aspect, there is provided a carrier containing the computer program above, wherein the carrier is one of an electronic signal, optical signal, radio signal, or non-transitory computer readable storage medium.

According to the invention in a fifth aspect, there is provided a node for use as a Policy and Charging Rules Function, PCRF. The node comprises a receiving means, which may be a receiver, configured to receive a plurality of preliminary messages from a further node for use as a P-CSCF, wherein each preliminary message corresponds to an early media session to be created by the node and comprises a unique identifier for the early media session. The node comprises an early media session controlling means, which may be an early media session controller, configured to store the unique identifier in a memory and to control a transmitting means, which may be a transmitter, to transmit a policy and charging control, PCC, message to a second further node for use as a Policy and Charging Enforcement Function, PCEF. The receiver is further configured to receive an updating message comprising a unique identifier of at least one of the early media sessions and updating data for updating the at least one early media session. The node further comprises an early media session updating means, which may be an early media session updater, configured to identify the at least one early media session based on the received unique identifier in the updating message, and to control the transmitter to transmit an updated PCC message comprising the received updating data to the second further node.

Optionally, the early media session updater is configured to retrieve the unique identifier from a received message, to review the stored unique identifiers and, if the retrieved unique identifier matches a stored unique identifier, to determine that the message is an updating message.

Optionally, the PCC message comprises PCC rules, which may comprise one or more of: Internet Protocol flows, gate status and Quality of Service.

According to the invention in a sixth aspect, there is provided a method for operating a node for use as a Policy and Charging Rules Function, PCRF. The method comprises receiving, by a receiving means, which may be a receiver, a plurality of preliminary messages from a further node for use as a P-CSCF, wherein each preliminary message corresponds to an early media session to be created by the node and comprises a unique identifier for the early media session. The method comprises storing, by an early media session controlling means, which may be an early media session controller, the unique identifier in a memory. The method comprises controlling, by the early media session controller, a transmitting means, which may be a transmitter to transmit a policy and charging control, PCC, message to a second further node for use as a Policy and Charging Enforcement Function, PCEF. The method comprises receiving, by the receiver, an updating message comprising a unique identifier of at least one of the early media sessions and updating data for updating the at least one early media session. The method comprises identifying, by an early media session updating means, which may be an early media session updater, the at least one early media session based on the received unique identifier in the updating message. The method comprises controlling, by the early media session updater, the transmitter to transmit an updated PCC message comprising the received updating data to the second further node.

Optionally, the method further comprises the early media session updater retrieving the unique identifier from a received message, reviewing the stored unique identifiers and, if the retrieved unique identifier matches a stored unique identifier, determining that the message is an updating message.

Optionally, the PCC message comprises PCC rules, which may comprise one or more of: Internet Protocol flows, gate status and Quality of Service.

According to the invention in a seventh aspect, there is provided a computer program comprising instructions which, when executed on at least one processor, cause the at least one processor to carry out the method above.

According to the invention in a eighth aspect, there is provided a carrier containing the computer program above, wherein the carrier is one of an electronic signal, optical signal, radio signal, or non-transitory computer readable storage medium.

BRIEF DESCRIPTION OF DRAWINGS

Exemplary embodiments of the invention are disclosed herein with reference to the accompanying drawings, in which.

DETAILED DESCRIPTION

The methods and apparatuses disclosed herein provide a new mechanism for the P-CSCF to modify the session information of a particular preliminary forking response.

The methods and apparatuses disclosed may use the inclusion of a unique reference identifier, hereinafter unique identifier (UI), for each dialog in the case of multiple preliminary responses due to forking. The P-CSCF may add the unique identifier in the AAR message allowing it to update the service information for a particular forking dialog, as opposed to simply set the SIP-Forking-Indication AVP to the value SEVERAL_DIALOGS. The PCRF then provides the updated information towards a Policy and Charging Enforcement Function (PCEF) (including service data flow filters, QoS information and gating status). As commented above, An AA-Request (AAR) message is acknowledged towards the P-CSCF with an AA-Answer (AAA) message. For the sake of simplicity, AAA messages are neither further commented throughout this specification nor illustrated in any drawing.

The unique identifier that can be used for SIP forking may consist of, or may comprise, for example, one or more of the following.

An ordinal number assigned by the P-CSCF for each early dialog in the order of increasing time of arrival of the first preliminary SIP response (180/183) from each terminating end point.

The SIP dialog identifier, which is contained within SIP messages

Any other unique reference identifier for a particular forked dialog

In order to maintain backward compatibility it is proposed to add the SIP forking unique identifier in a new AVP called "SIP-Forking-Reference". Alternatively, the existing SIP-Forking-Indication AVP can be extended with new ordinal values such as "DIALOG_ONE", "DIALOG_TWO", etc.

Figure 1:
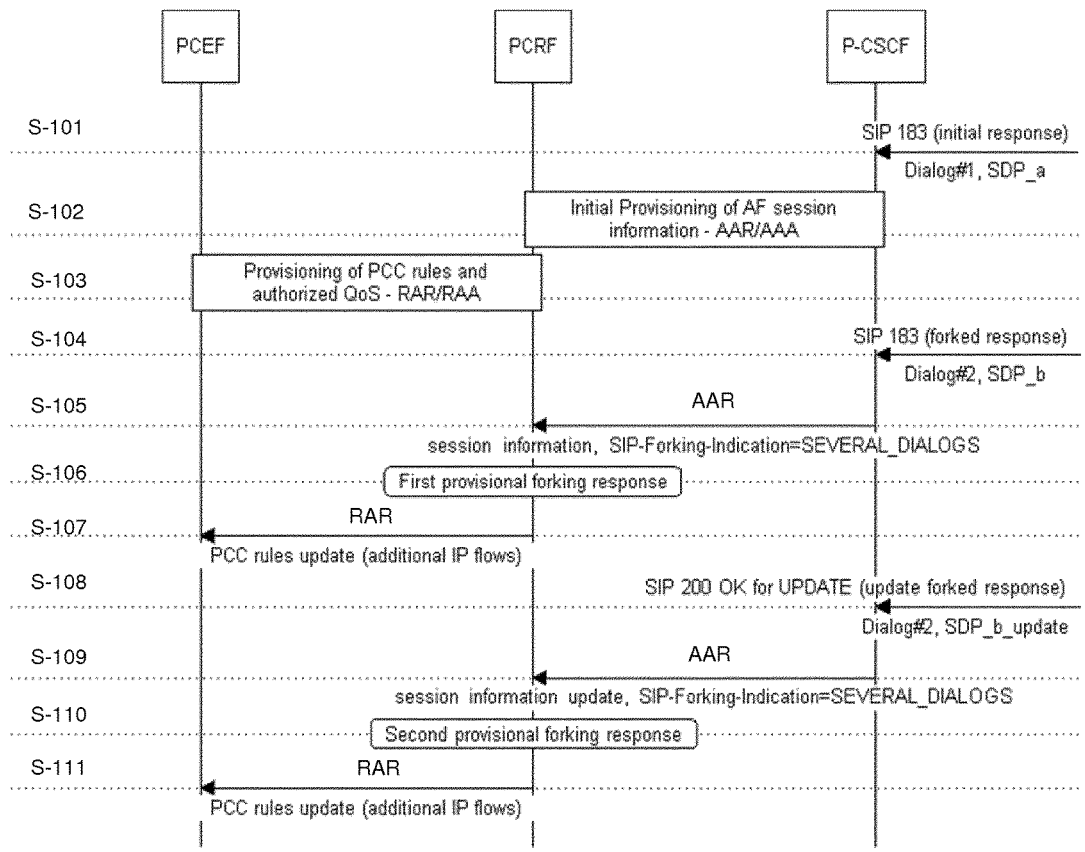
FIG. 1 is a signalling diagram showing SIP forking policy control in 3GPP.
Figure 2:
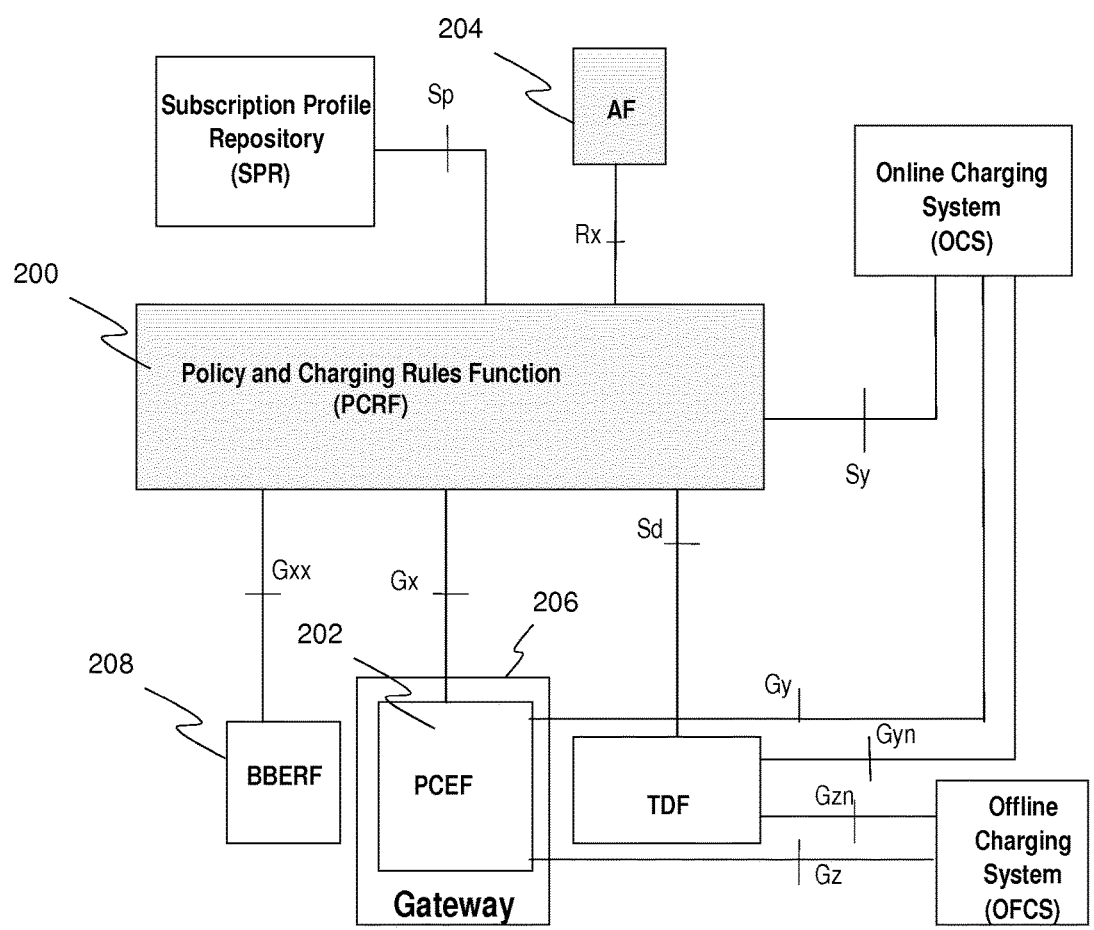
FIG. 2 is an architecture diagram for PCC.

The architecture that supports Policy and Charging Control functionality is depicted in FIG. 2. This figure has been taken from TS 23.203 (V.12.4.0) that specifies the PCC functionality for the Evolved 3GPP Packet Switched domain, including both 3GPP accesses (GERAN/UTRAN/E-UTRAN) and Non-3GPP accesses.

Referring to FIG. 2, a PCRF 200 is in electrical communication with a PCEF 202 via a Gx interface. The PCRF 200 is also in electrical communication with an AF 204 via an Rx interface.

The PCRF 200 is a functional element that encompasses policy control decision and flow based charging control functionalities. The PCRF 200 provides network control regarding the service data flow detection, gating, QoS and flow based charging (except credit management) towards the PCEF 202. The PCRF 200 receives session and media related information from the AF 204 and informs AF 204 of traffic plane events. The PCRF 200 provisions PCC Rules to the PCEF 202 via the Gx reference point. The PCRF 200 may inform the PCEF 202 through the use of PCC rules on the treatment of each service data flow that is under PCC control, in accordance with the PCRF policy decision(s).

The AF 204 is an element offering applications in which service is delivered in a different layer (i.e. transport layer) from the one the service has been requested (i.e. signaling layer), the control of IP bearer resources according to what has been negotiated. One example of an AF 204 is the P-CSCF of the IMS and, therefore, the terms AF and P-CSCF are used interchangeably herein. The AF 204 communicates with the PCRF 200 to transfer dynamic session information (i.e. description of the media to be delivered in the transport layer) and to request access network information. This communication is performed using the Rx interface.

The PCEF 202 encompasses service data flow detection (based on the filters definitions included in the PCC rules), as well as online and offline charging interactions and policy enforcement. Since the PCEF 202 is the system element handling the bearers, this is where the QoS is being enforced for the bearer according to the QoS information coming from the PCRF 200. This functional entity is located at a Gateway 206 (e.g. GGSN in the GPRS case, PGW in the EPS case and PDG in the untrusted WLAN case). For the cases where Proxy Mobile IP (PMIP) is used instead of General Packet Radio Service (GPRS) Tunneling Protocol (GTP) between a Bearer Binding and Event Reporting Function (BBERF) 208 and the PCEF 202, the bearer control is done in the BBERF instead.

Figure 3:
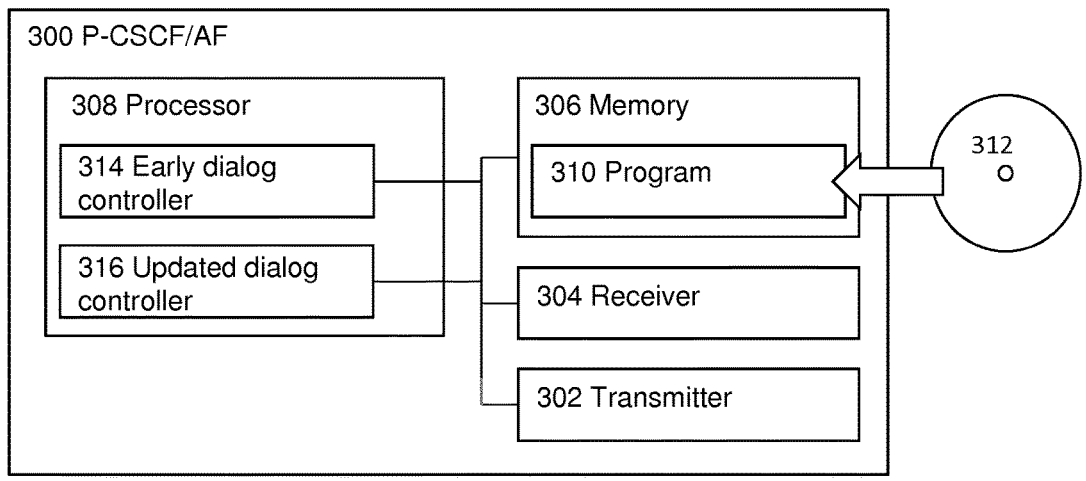
FIG. 3 is a block schematic diagram of a P-CSCF.

FIG. 3 shows a schematic diagram of a network node 300. The network node 300 may be a P-CSCF or AF 204.

The node 300 comprises a transmitter 302 and a receiver 304. The transmitter 302 and receiver 304 are in electrical communication with other communication units, nodes, UEs, servers and/or functions in a telecommunications network and are configured to transmit and receive data accordingly. Transmitter 302 and receiver 304 may be provided with a transceiver, not illustrated in the drawing, for transmitting and receiving data accordingly.

It is noted that the term "electrical communication" encompasses both wired and wireless electrical communication. Therefore, electrical communication may be, for example, a network communication over a wired connection or a network communication of over a radio frequency connection.

The node 300 further comprises at least one memory 306 and at least one processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake at least the functions of an early dialog controller 314 and an updated dialog controller 316, as set out herein.

Each of the transmitter 302 and receiver 304, memory 306, processor 308, early dialog controller 314 and updated dialog controller 316 is in electrical communication with the other features of the node 300. The node 300 can be implemented as a combination of computer hardware and software. In particular, the early dialog controller 314 and updated dialog controller 316 may be implemented as software configured to run on the processor 308. The at least one memory 306 stores the various programs or executable files that are implemented by a processor 308, and also provides a storage unit for any required data. The programs or executable files stored in the memory 306, and implemented by the processor 308, can include the early dialog controller 314 and updated dialog controller 316, but are not limited to such.

Figure 4:
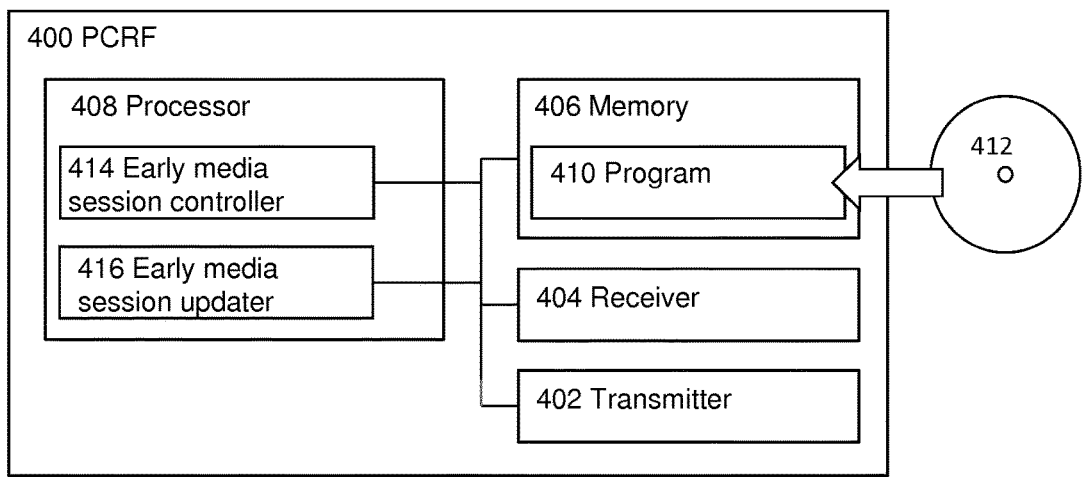
FIG. 4 is a block schematic diagram of a PCRF.

FIG. 4 shows a schematic diagram of a network node 400. The network node 400 may be a PCRF 200.

The node 400 comprises a transmitter 402 and a receiver 404. The transmitter 402 and receiver 404 are in electrical communication with other communication units, nodes, UEs, servers and/or functions in a telecommunications network and are configured to transmit and receive data accordingly. Transmitter 402 and receiver 404 may be provided with a transceiver, not illustrated in the drawing, for transmitting and receiving data accordingly.

The node 400 further comprises at least one memory 406 and at least one processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake at least the functions of an early media session controller 414 and an early media session updater 416, as set out herein.

Each of the transmitter 402 and receiver 404, memory 406, processor 408, early media session controller 414 and early media session updater 416 is in electrical communication with the other features of the node 400. The node 400 can be implemented as a combination of computer hardware and software. In particular, the early media session controller 414 and early media session updater 416 may be implemented as software configured to run on the processor 408. The at least one memory 406 stores the various programs or executable files that are implemented by a processor 408, and also provides a storage unit for any required data. The programs or executable files stored in the memory 406, and implemented by the processor 408, can include the early media session controller 414 and early media session updater 416, but are not limited to such.

Figure 5:
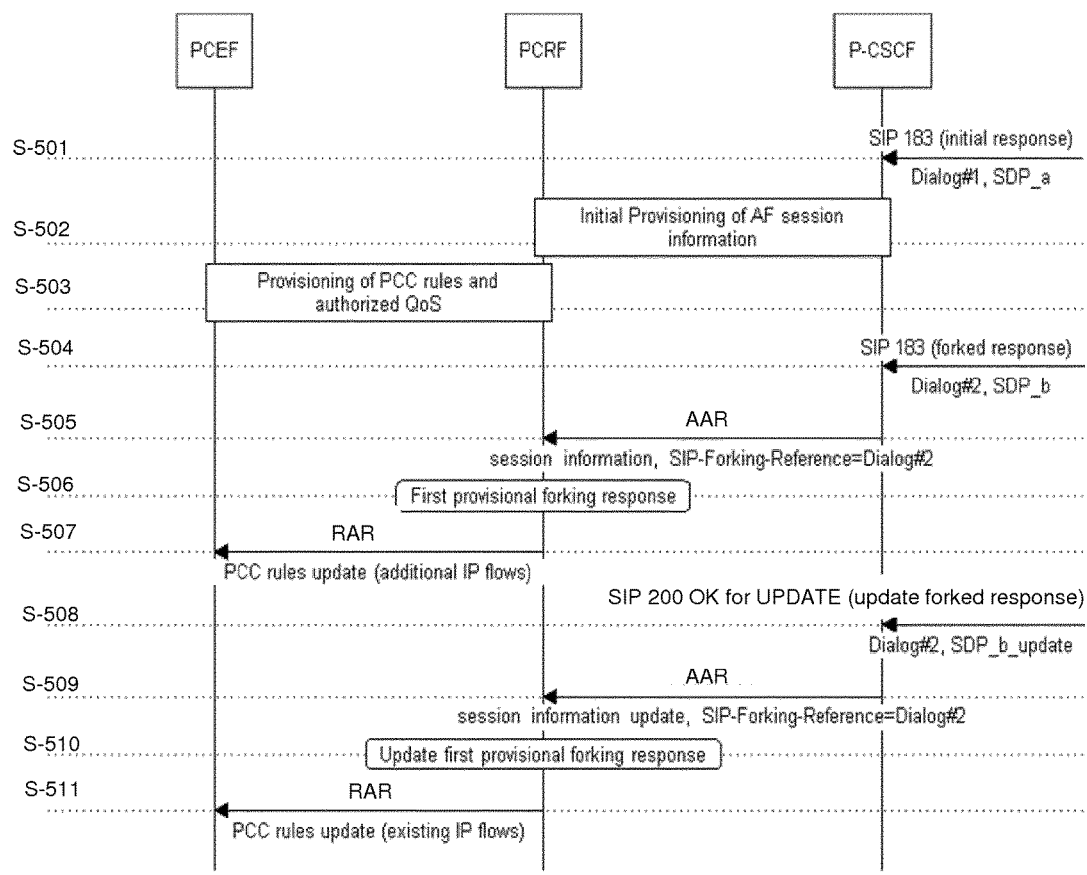
FIG. 5 is signalling diagram showing an embodiment of the invention to enhance SIP forking policy control.

FIG. 5 shows the mechanism proposed in the methods and apparatuses disclosed herein to enhance policy control in SIP forking scenarios. The P-CSCF 204 provides a unique identifier in a new SIP-Forking-Reference AVP when provisioning the service information, which corresponds to a first preliminary response (step S-501) in a SIP forking scenario, to the PCRF 200 (step S-505) for a corresponding early media session to be created at the PCRF. When the P-CSCF 204 receives a subsequent SDP offer-answer exchange updating service information for a subsequent early dialogue (step S-508), the P-CSCF 204 can modify the service information previously provided to the PCRF 200 for this particular forking leg by making use of the same unique identifier in the SIP-Forking-Reference AVP.

This allows the PCRF 200 to modify the PCC rules and IP flows already provided to the PCEF 202 for this particular forking leg.

Referring to FIG. 5:

S-501. A UE initiates a SIP session that is sent to multiple destinations in the terminating IMS network due to SIP forking. The UE may do this by sending SIP message to the P-CSCF (AF) 204 through the gateway 206 of FIG. 2. The P-CSCF 204 receives a first preliminary response for a first early dialog that includes an SDP answer payload.

S-502. The P-CSCF 204 sends corresponding first service information to the PCRF 200 for the purpose of authorizing the IP flows and the QoS resources required for the negotiated IMS session. The P-CSCF 204 includes a first unique identifier (UI#1) in the SIP-Forking-Reference AVP within the AAR message.

S-503. The PCRF 200 performs session binding, authorizes the service information and provisions the PCC rules in the PCEF 202.

S-504. The P-CSCF 204 receives a second preliminary response for a second (new) early dialogue.

S-505 The P-CSCF 204 sends an AAR message within the existing Diameter session containing a second unique identifier (UI#2) in the SIP-Forking-Reference AVP and including second service information derived from this second preliminary response.

S-506. The PCRF 200 identifies the existing authorization information for the P-CSCF session, and authorizes the maximum bandwidth required by any of the dialogues identified by the first and the second unique identifiers.

S-507 The PCRF 200 updates the PCC rules it previously provided to the PCEF 202 with additional service data flow filters corresponding to the second service information and with updated QoS information.

S-508. The P-CSCF 204 receives a further preliminary response with an update to the SDP offer-answer exchange within the second early dialog and updates the second service information previously provided to the PCRF 200 for this particular forking leg.

S-509. The P-CSCF 204 sends an AAR message within the existing Diameter session containing the second unique identifier (UI#2) in the SIP-Forking-Reference AVP and including the updated second service information derived from the latest preliminary response.

S-510. The PCRF 200 can identify that this is a modification of the session information for a previous preliminary response, e.g. the second session information, by looking at the value provided in the SIP-Forking-Reference AVP, e.g. the second unique identifier (UI#2).

S-511. The PCRF 200 then updates the information provided in the existing PCC rules towards the PCEF 202 (including updated service data flow filters, updated QoS information, gating status, etc.).

The methods and apparatuses disclosed herein provide a mechanism for the P-CSCF 204 to update the session information for each subsequent SDP offer-answer exchange within an early dialog due to SIP forking. The P-CSCF 204 provides a unique identifier in the SIP-Forking-Reference AVP when provisioning the service information of the initial response and for any additional early media session. The PCRF 200 stores the SIP-Forking-Reference information together with the service information for each forking leg.

The P-CSCF 204 can update the service information of a particular early dialog by using an AAR message within the existing Diameter session containing the SIP-Forking-Reference AVP with the particular unique identifier for this particular early media session.

If the AAR message contains an existing unique identifier in the SIP-Forking-Reference AVP, the PCRF 200 transmits modified PCC rules based on the updated information (e.g. IP flows, gate status, QoS) to the PCEF 202. The PCEF updates the PCC information previously provided to the PCEF 202 for this particular forking leg.

If an AAR command transmitted to the PCRF 200 contains a new value as unique identifier in the SIP-Forking-Reference AVP, the PCRF 200 modifies the PCC rules to include the new service data flow filters provided for the new forking leg.

Figure 6:
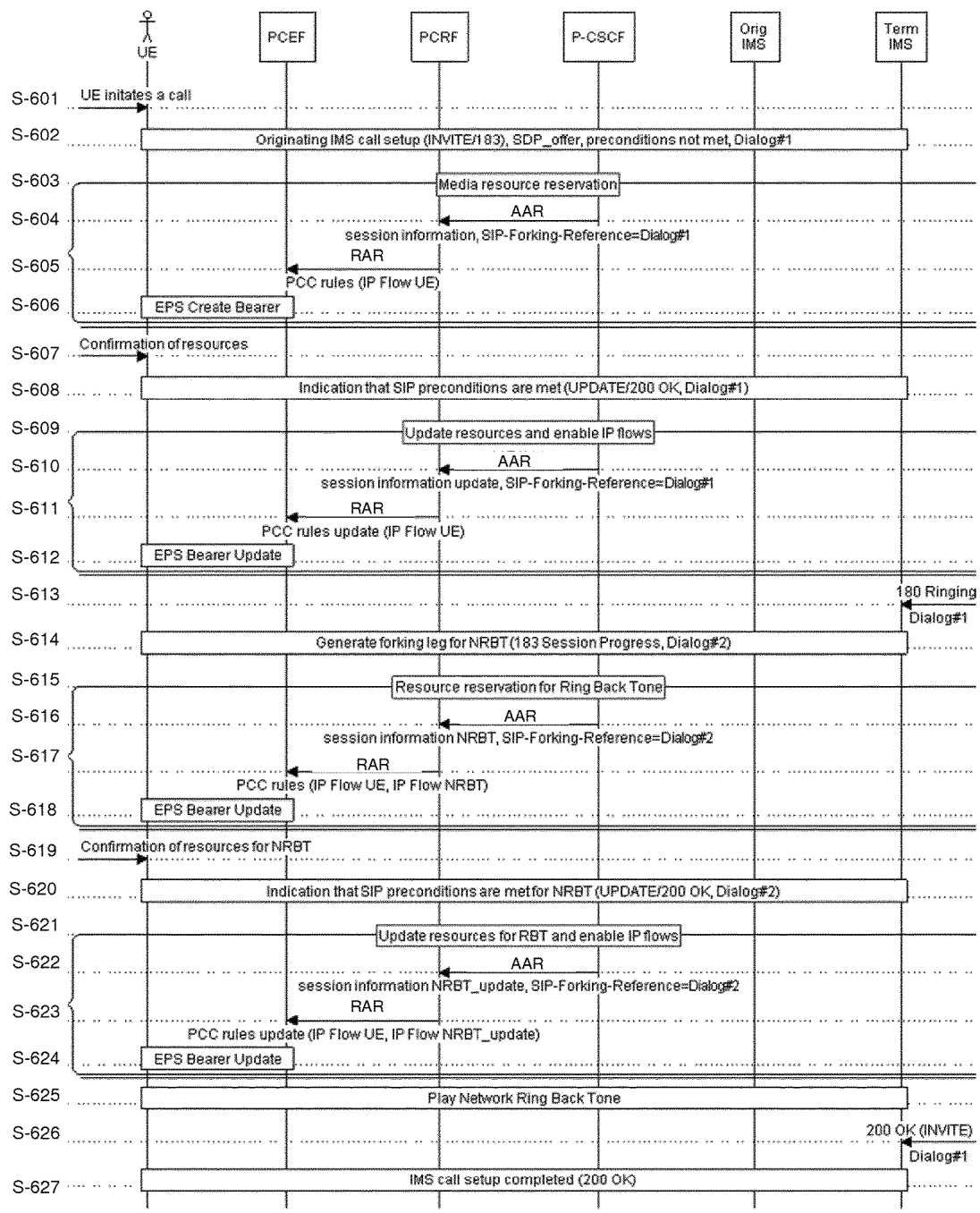
FIG. 6 is a signalling diagram showing an embodiment of the invention to enhance SIP forking policy control and applicable when an IMS session uses the network ring back tone service.

FIG. 6 shows a message flow for the establishment of an IMS call that includes the NRBT service generated using the forking model, and QoS preconditions. Only the originating domain is shown in detail. FIG. 6 relates to exemplary methods and apparatuses using a network ring back tone, although the methods and apparatus disclosed herein may be applied to any scenario using SIP forking. Referring to FIG. 6:

During steps S-601 and S-602, the user initiates a call. The UE sends a SIP INVITE requests containing an SDP offer and requesting for preconditions negotiation. The terminating side answers with a SIP 183 Session in Progress indicating the media resources for the remote side.

During steps S-603 to S-606, media resource reservation takes place. The P-CSCF 204 sends (step S-604) an Rx AAR command to the PCRF 200 to allocate resources in the EPC including media information for the session. The AAR command includes a first SIP-Forking-Reference AVP as a unique identifier (Dialog#1) for a first early dialog. The PCRF 200 associates the received service data flows to an existing IP Connectivity Access Network (IP-CAN) session and creates a set of policy rules for the media negotiated, which triggers the PGW to create a new dedicated bearer for each media type being negotiated. An example is given below for possible values in the AAR message session information. The exemplary IMS session contains a single media component (AUDIO at 30.5 kbps) with two media sub-components. Flow number #1 carries the Real-time Transport Protocol (RTP) data and flow number #2 the Real-time Transport Control Protocol (RTCP) data.

---

Session information in AAR message (step S-604)

AAR
.......
   Media-Component-Description
     Media-Component-Number = 1
     Media-Type = AUDIO
     Max-Requested-Bandwidth-UL = 30500
     Max-Requested-Bandwidth-DL = 30500
     SIP-Forking-Reference = Dialog#1
     Media-Sub-Component
       Flow-Number = 1
       Flow-Status = DISABLED
       Flow-Description = permit out 17 from 10.168.1.98 2252 to 10.168.1.124 37006
       Flow-Description = permit in 17 from 10.168.1.124 37006 to 10.168.1.98 2252
       Flow-Usage = NO__INFORMATION
     Media-Sub-Component
       Flow-Number = 2
       Flow-Status = ENABLED
       Flow-Description = permit out 17 from 10.168.1.98 2253 to 10.168.1.124 37007
       Flow-Description = permit in 17 from 10.168.1.124 37007 to 10.168.1.98 2253
       Flow-Usage = RTCP
.......

---

During the steps S-607 and S-608, the UE detects that preconditions are met and sends a SIP UPDATE to the remote side. The remote party answers with a SIP 200 OK for UPDATE.

During the steps S-609 to S-612, resources are updated and IP flows enabled. Resource allocation is updated according to the last received SDP, and the P-CSCF 204 enables media IP flows to allow early media by setting the Flow-Status AVP. The P-CSCF 204 sends an Rx AAR command to the PCRF 200 to update the media information, and the PCRF 200 sends a Gx Re-Authorization-Request (RAR) message to the PGW 206 in order to update the PCC rules information. A Re-Authorization-Request (RAR) message is acknowledged towards the PCRF with a Re-Authorization-Answer (RAA) message. For the sake of simplicity, RAA messages are neither further commented throughout this specification nor illustrated in any drawing.

During the step S-613, the remote party stars alerting the called user and sends a SIP 180 Ringing reply towards the originating side.

During the step S-614, a terminating Multimedia Telephony Application Server (MTAS) invokes the NRBT service and sends a forked SIP 183 response back towards the originating UE. The SIP 183 contains a second (new) SIP dialog identifier, includes the SDP information for the NRBT, and also includes a P-Early-media header to indicate the authorized early media direction.

During the steps S-615 to S-616, resource reservation for ring back tone starts. The P-CSCF 204, when receiving the forked 183 with early media, sends an AAR with the media information and additionally, the SIP-Forking-Reference AVP contains a second unique identifier (Dialog#2) for the second forking leg. An example is given below for possible values in the AAR message with session information for NRBT. The NRBT session contains a single media component (AUDIO at 50 kbps) with two media sub-components. Flow number #1 carries the RTP data and flow number #2 the RTCP data. It can be seen that the forking leg contains a new set of IP flows that need to be authorized by the PCRF 200 and requires higher bandwidth than the initial resource reservation in step S-604.

---

Session information for NRBT in AAR message (step S-616)

AAR
.......
  Media-Component-Description
    Media-Component-Number = 1
      Media-Type = AUDIO
      Max-Requested-Bandwidth-UL = 50000
      Max-Requested-Bandwidth-DL = 50000
      SIP-Forking-Reference = Dialog#2
      Media-Sub-Component
        Flow-Number = 1
        Flow-Status = DISABLED
        Flow-Description = permit out 17 from 10.168.1.98 2252 to 10.168.1.124 38006
        Flow-Description = permit in 17 from 10.168.1.124 38006 to 10.168.1.98 2252
        Flow-Usage = NO_INFORMATION
      Media-Sub-Component
        Flow-Number = 2
        Flow-Status = ENABLED
        Flow-Description = permit out 17 from 10.168.1.98 2253 to 10.168.1.124 38007
        Flow-Description = permit in 17 from 10.168.1.124 38007 to 10.168.1.98 2253
        Flow-Usage = RTCP
.......

---

During the steps S-617 and S-618, the PCRF updates the provisioned PCC rules to include additional service data flow filters for the forked request. Also, if the forked NRBT response requires higher bandwidth than the first call leg, PCRF adds the additional bandwidth required to the policy rules.

An example is given below for possible values in the RAR message PCC rule information. The message contains two PCC rules, one for the RTP flow and one for the RTCP flow. The new RTP and RTCP IP flows for the second forking leg (NRBT) are added to the PCC rules created for flow number #1 and flow number #2, respectively.

---

PCC rule information in RAR message (step S-617)

RAR
.......
  Charging-Rule-Install
    Charging-Rule-Definition
      Charging-Rule-Name = "pcc_rule_name_for_rtp"
      Flow-Status = DISABLED
      Flow-Information
        Flow-Description = permit out 17 from 10.168.1.98 2252 to 10.168.1.124 37006
      Flow-Information
        Flow-Description = permit in 17 from 10.168.1.124 37006 to 10.168.1.98 2252
      Flow-Information
        Flow-Description = permit out 17 from 10.168.1.98 2252 to 10.168.1.124 38006
      Flow-Information
        Flow-Description = permit in 17 from 10.168.1.124 38006 to 10.168.1.98 2252

---

PCC rule information in RAR message (step S-617) — continued

QoS-Information
        QoS-Class-Identifier = QCI_1
        Guaranteed-Bitrate-UL = 50000
        Guaranteed-Bitrate-DL = 50000
    Charging-Rule-Definition
      Charging-Rule-Name = "pcc_rule_name_for_rtcp"
      Flow-Status = ENABLED
      Flow-Information
        Flow-Description = permit out 17 from 10.168.1.98 2253 to 10.168.1.124 37007
      Flow-Information
        Flow-Description = permit in 17 from 10.168.1.124 37007 to 10.168.1.98 2253
      Flow-Information
        Flow-Description = permit out 17 from 10.168.1.98 2253 to 10.168.1.124 38007
      Flow-Information
        Flow-Description = permit in 17 from 10.168.1.124 38007 to 10.168.1.98 2253
      QoS-Information
        QoS-Class-Identifier = QCI_1
        Guaranteed-Bitrate-UL = 2500
        Guaranteed-Bitrate-DL = 2500
........

---

During the steps S-619 to S-622, when the UE detects that preconditions are met for the forking leg, there is another SIP UPDATE/200 OK negotiation and the P-CSCF 204 sends an Rx AAR command to the PCRF 200 to update the media information for the second forking dialog. An example is given below for possible values in the AAR message with session information update for NRBT. The AAR message contains the second unique identifier (Dialog#2) in the SIP-Forking-Reference AVP, together with updated service information for the RTP (flow number #1) and RTCP media (flow number #2). The PCRF 200 detects that this message does not correspond to a new forking leg, but modifies the service information provided in step S-616 for the NRBT. In the example, the AAR message enables the IP flow for NRBT.

---

Session information for NRBT in AAR message (step S-622)

AAR
.......
  Media-Component-Description
    Media-Component-Number = 1
      Media-Type = AUDIO
      Max-Requested-Bandwidth-UL = 50000
      Max-Requested-Bandwidth-DL = 50000
      SIP-Forking-Reference = Dialog#2
      Media-Sub-Component
        Flow-Number = 1
        Flow-Status = ENABLED
        Flow-Description = permit out 17 from 10.168.1.98 2252 to 10.168.1.124 38006
        Flow-Description = permit in 17 from 10.168.1.124 38006 to 10.168.1.98 2252
        Flow-Usage = NO_INFORMATION
      Media-Sub-Component
        Flow-Number = 2
        Flow-Status = ENABLED
        Flow-Description = permit out 17 from 10.168.1.98 2253 to 10.168.1.124 38007
        Flow-Description = permit in 17 from 10.168.1.124 38007 to 10.168.1.98 2253
        Flow-Usage = RTCP
.......

---

23-24 During the steps S-623 and S-624, the PCRF 200 then transmits updated PCC rules to the PCEF 202 and enables the IP flow for NRBT. The contents of the PCC rule information in the RAR message is shown below.

---
PCC rule information in RAR message (step S-623)
---
RAR
.......
   Charging-Rule-Install
      Charging-Rule-Definition
         Charging-Rule-Name = "pcc_rule_name_for_rtp"
         Flow-Status = ENABLED
........

---

If the AAR message contains the SIP-Forking-Information AVP set to SEVERAL_DIALOGS and no unique identifier, according to the existing functionality, the PCRF 200 cannot detect that this is a modification of the session information for a previous forking response. The PCRF 200 would then update the provisioned PCC rules, as if it were an additional preliminary response due to forking, and include additional service data flow filters in the PCC rule definition. This results in unnecessary Traffic Flow Template (TFT) filters being installed in the PCEF 202, which trigger Evolved Packet System (EPS) bearer update procedures.

During the steps S-625 to S-627, the network plays the ring back tone to the originating terminal. When the terminating side answers the call, the early dialogue for NRBT is terminated and the service information is updated to match the requirements of the final SIP response.

Figure 7:
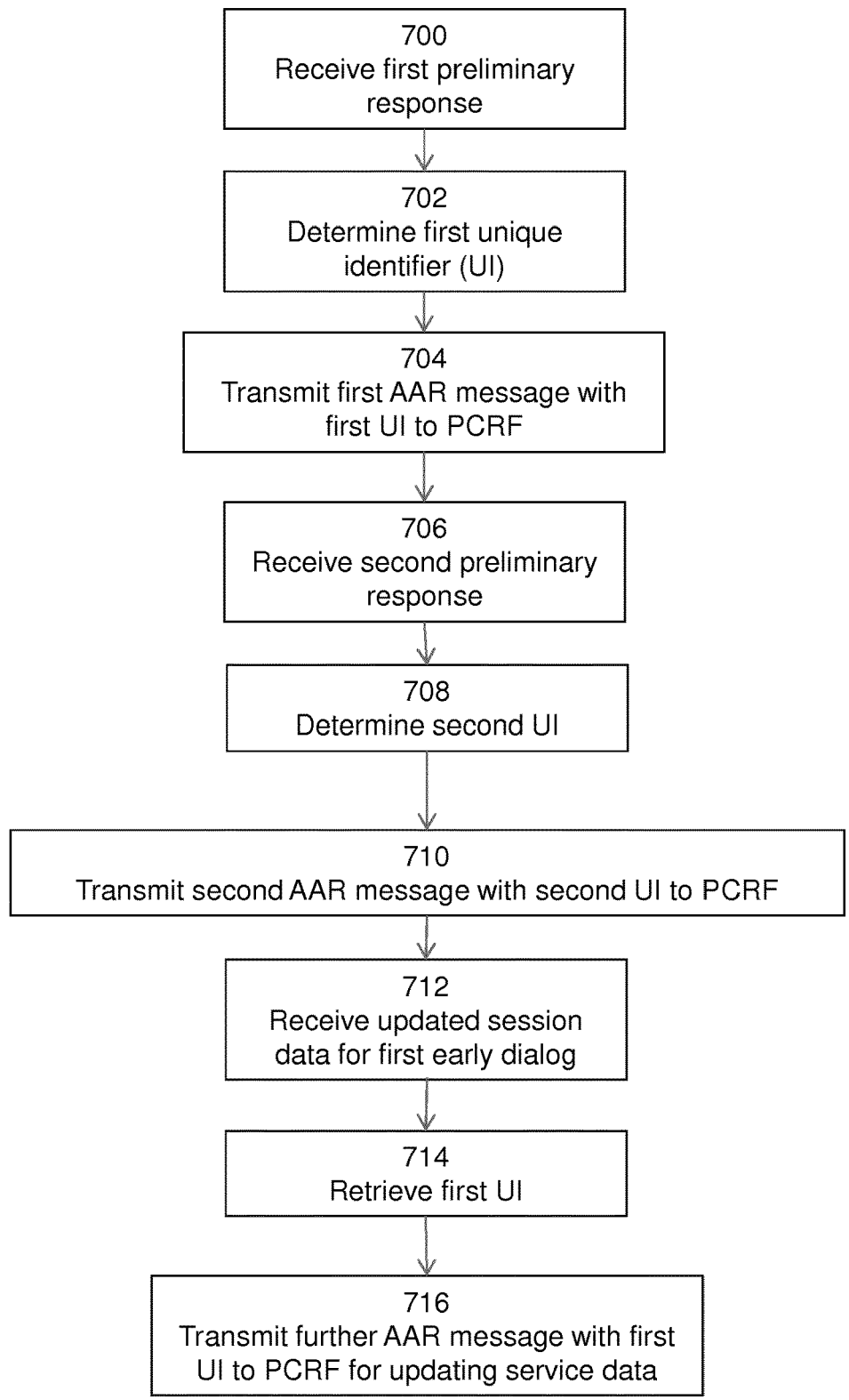
FIG. 7 is a flow diagram showing a method of operating a P-CSCF.

FIG. 7 shows a flow diagram of a method for operating a node (300) for use as a P-CSCF/AF 204.

The receiver 304 receives 700 a first preliminary response from a first terminating end point as part of SIP forking. The early dialog controller 314 determines 702 a first unique identifier for a first early dialog relating to the first preliminary response, as set out above. The early dialog controller 314 controls the transmitter 302 to transmit 704 a first preliminary message (initial provisioning message) to a PCRF 200 for creating a first early dialog, wherein the first preliminary message includes the first unique identifier. The first preliminary message may be an initial provisioning message, an AAR message.

The receiver 304 receives 706 a second preliminary response from a second terminating end point. The early dialog controller 314 determines 708 a second unique identifier for a second early dialog relating to the second preliminary response. The early dialog controller 314 controls the transmitter 302 to transmit 710 a second preliminary message to the PCRF 200 for creating a second early dialog, wherein the second preliminary message includes the second unique identifier. The second preliminary message may be an AAR message.

The receiver 304 receives 712 a message comprising updated service information for the first early dialog. The updated dialog controller 316 retrieves the first unique identifier from the updated message and then retrieves 714 the first unique identifier for the first early dialog, which has been stored in memory 306 by the early dialog controller 314 after being determined. As there is a match, the updated dialog controller 316 is able to determine that the message is an updating message. The updated dialog controller 316 controls the transmitter 302 to transmit 716 an updating message to the PCRF 200 for updating the first early dialog PCC rules, wherein the updating message comprises the first unique identifier and updating data, which is based on the received updated service data. The updating message may be an AAR message.

Figure 8:
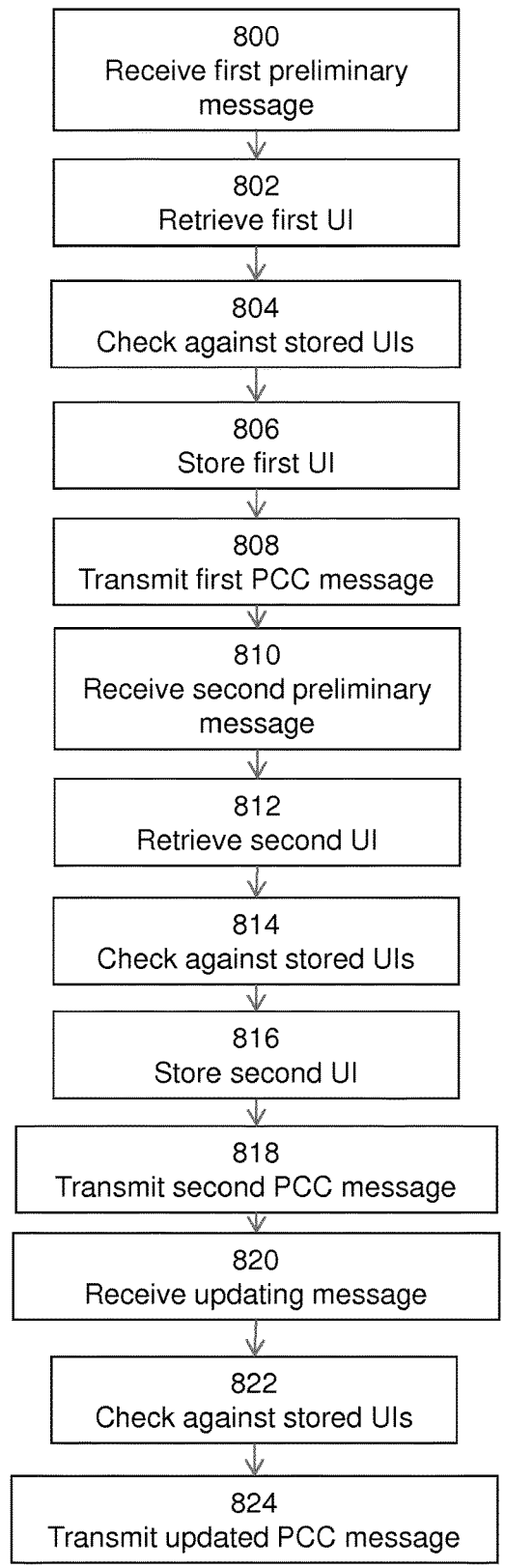
FIG. 8 is a flow diagram showing a method of operating a PCRF.

FIG. 8 is a flow diagram showing a method for controlling a node 400 for use as a PCRF 200.

The receiver 404 receives 800 a first preliminary message from the P-CSCF 204 for creating a first early media session. The first preliminary message comprises a first unique identifier for the first early media session. The early media session controller 414 retrieves 802 the first unique identifier from the received message, for example, by extracting it therefrom. The early media session controller 414 may check 804 the determined first unique identifier against unique identifiers stored in memory 406 to determine whether the received message is a new preliminary message or an updating message. As this is the first message received, this step may be omitted. The early media session controller 414 stores 806 the first unique identifier in the memory 406 and controls the transmitter 402 to transmit 808 a first PCC message corresponding to the first early media session to the PCEF 202.

The receiver 404 receives 810 a second preliminary message from the P-CSCF 204, corresponding to a second early media session to be created and comprising a second unique identifier. As before, the early media session controller 414 retrieves 812 the second unique identifier from the received message and checks 814 the retrieved second unique identifier against unique identifiers stored in memory 406. As this is a second unique identifier, there is no match so the early media session controller 414 stores 816 the second unique identifier in memory 406 and controls the transmitter 402 to transmit 818 a second PCC message corresponding to the second early media session to the PCEF 202.

The receiver 404 receives 820 an updating message from the P-CSCF 204 for the first early media session. The updating message comprises the first unique identifier and data for updating the first early media session. The early media session updater 416 retrieves the first unique identifier from the received updating message and checks 822 it against the stored unique identifiers. In this case, there is a match against the first unique identifier and the early media session updater 416 determines that the message is an updating message for the first early media session rather than a new preliminary message. The early media session updater 416 controls the transmitter 402 to transmit 824 an updating PCC message corresponding to the first early media session and comprising the first unique identifier and data corresponding to the received updated data to the PCEF 202.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The methods and apparatus disclosed herein provide new mechanisms for the P-CSCF 204 to update the session information for each subsequent SDP offer-answer exchange within an early dialog due to SIP forking.

The following benefits are highlighted:
  Enables the P-CSCF 204 to modify the session information of a particular early dialog due to SIP forking.
  Enables the PCRF 200 to perform independent policy control per early media session due to SIP Forking.
  In scenarios with CAT or NRBT services, enables the PCRF 200 to detect that only the flow state is changed, and not all flow information at an Rx update from P-CSCF 204.
  Decreases the number of EPS bearer update procedures towards the UE due to unnecessary updates of the service data flow filters in the PCC rule definition during SIP forking.
  Every update bearer request increases the likelihood that the call setup will fail.
  Each update bearer request requires a Radio Resource Control (RRC) reconfiguration, which introduces at least 60 ms extra delay for the call setup.
  Each update bearer request increases the chance of race conditions in the PGW 206.
  Increases the likelihood for call setup success, and decreases the dimensioning needs of Evolved Packet Core (EPC) and Radio Access Network (RAN), in SIP forking scenarios.

The skilled person will be able to envisage other embodiments without departing from the scope of the appended claims.

The invention claimed is:

1. A node for use as a Proxy Call Session Control Function, P-CSCF, in a telecommunications network, the node comprising:
  a receiver configured to receive a plurality of preliminary responses originating from a plurality of terminating end points as part of Session Initiation Protocol, SIP, forking;
  an early dialog controller configured, for each received preliminary response, to determine a unique identifier and to control a transmitter to transmit a corresponding preliminary message comprising the unique identifier to a further node for use as a Policy and Charging Rules Function, PCRF, for creating an early dialog by the further node,
  wherein the receiver is further configured to receive updated data for at least one of the preliminary responses, the node further comprising
  an updated dialog controller configured to retrieve the unique identifier corresponding to the at least one preliminary response and control the transmitter to transmit an updating message based on the updated data and comprising the retrieved unique identifier to the further node for updating the corresponding early dialog.

2. The node according to claim 1, wherein the early dialog controller is configured to determine the unique identifier by creating said unique identifier or by using a SIP dialog identifier, which is included in the received preliminary response, as a basis for creating said unique identifier.

3. The node according to claim 1, wherein the preliminary message and/or the updating message is an AA-Request, AAR.

4. The node according to claim 3, wherein the early dialog controller is configured to determine the unique identifier as a new attribute value pair, AVP, for adding to the AAR, or to extend an existing AVP of the AAR.

5. The node according to claim 1, wherein the updated data comprises data updating the service information for at least one early dialog.

6. A method for controlling a node for use as a Proxy Call Session Control Function, P-CSCF, in a telecommunications network, the method comprising:

receiving, by a receiver, a plurality of preliminary responses originating from a plurality of terminating end points as part of Session Initiation Protocol, SIP, forking;

determining, by an early dialog controller, for each received preliminary response, a unique identifier;

controlling, by the early dialog controller, a transmitter to transmit a corresponding preliminary message comprising the unique identifier to a further node for use as a Policy and Charging Rules Function, PCRF, for creating an early dialog by the further node;

receiving, by the receiver, updated data for at least one of the preliminary responses;

retrieving, by an updated dialog controller, the unique identifier corresponding to the at least one preliminary response; and controlling, by the updated dialog controller, the transmitter to transmit an updating message based on the updated data and comprising the retrieved unique identifier to the further node for updating the corresponding early dialog.

7. The method according to claim 6, further comprising the early dialog controller determining the unique identifier by creating said unique identifier or by using a SIP dialog identifier, which is included in the received preliminary response, as a basis for creating said unique identifier.

8. The method according to claim 6, wherein the preliminary message and/or the updating message is an AA-Request, AAR.

9. The method according to claim 8, further comprising the early dialog controller determining the unique identifier as a new attribute value pair, AVP, for adding to the AAR, or to extend an existing AVP of the AAR.

10. The method according to claim 6, wherein the updated data comprises data updating the service information for at least one early dialog.

11. A non-transitory computer readable storage medium comprising a computer program comprising instructions which, when executed on at least one processor, cause the at least one processor to carry out the method according to claim 6.

12. A node for use as a Policy and Charging Rules Function, PCRF, the node comprising:

a receiver configured to receive a plurality of preliminary messages from a further node for use as a P-CSCF, wherein each preliminary message corresponds to an early media session to be created by the node and comprises a unique identifier for the early media session;

an early media session controller configured to store the unique identifier in a memory and to control a transmitter to transmit a policy and charging control, PCC, message to a second further node for use as a Policy and Charging Enforcement Function, PCEF, wherein the receiver is further configured to receive an updating message comprising a unique identifier of at least one of the early media sessions and updating data for updating the at least one early media session, the node further comprising an early media session updater configured to identify the at least one early media session based on the received unique identifier in the updating message, and to control the transmitter to transmit an updated PCC message comprising the received updating data to the second further node.

13. The node according to claim 12, wherein the early media session updater is configured to retrieve the unique identifier from a received message, to review the stored unique identifiers and, if the retrieved unique identifier matches a stored unique identifier, to determine that the message is an updating message.

14. The node according to claim 12, wherein the PCC message comprises PCC rules, which may comprise one or more of: Internet Protocol flows, gate status and Quality of Service.

15. A method for operating a node for use as a Policy and Charging Rules Function, PCRF, the method comprising:

receiving, by a receiver, a plurality of preliminary messages from a further node for use as a P-CSCF, wherein each preliminary message corresponds to an early media session to be created by the node and comprises a unique identifier for the early media session;

storing, by an early media session controller, the unique identifier in a memory;

controlling, by the early media session controller, a transmitter to transmit a policy and charging control, PCC, message to a second further node for use as a Policy and Charging Enforcement Function, PCEF;

receiving, by the receiver, an updating message comprising a unique identifier of at least one of the early media sessions and updating data for updating the at least one early media session;

identifying, by an early media session updater, the at least one early media session based on the received unique identifier in the updating message; and controlling, by the early media session updater, the transmitter to transmit an updated PCC message comprising the received updating data to the second further node.

16. The method according to claim 15, further comprising the early media session updater retrieving the unique identifier from a received message, reviewing the stored unique identifiers and, if the retrieved unique identifier matches a stored unique identifier, determining that the message is an updating message.

17. The method according to claim 15, wherein the PCC message comprises PCC rules, which may comprise one or more of: Internet Protocol flows, gate status and Quality of Service.

18. A non-transitory computer readable storage medium comprising a computer program comprising instructions which, when executed on at least one processor, cause the at least one processor to carry out the method according to claim 15.

* * * * *